(12) United States Patent
Cai

(10) Patent No.: US 8,385,749 B2
(45) Date of Patent: Feb. 26, 2013

(54) HIGH SPEED OPTICAL TRANSMITTER WITH DIRECTLY MODULATED LASER SOURCE

(75) Inventor: Yuanmin Cai, Closter, NJ (US)

(73) Assignee: International Business Machines Corporation, Armonk, NY (US)

( * ) Notice: Subject to any disclaimer, the term of this patent is extended or adjusted under 35 U.S.C. 154(b) by 291 days.

(21) Appl. No.: 12/784,765

(22) Filed: May 21, 2010

(65) Prior Publication Data

US 2011/0002698 A1    Jan. 6, 2011

Related U.S. Application Data

(63) Continuation-in-part of application No. 12/496,835, filed on Jul. 2, 2009, now Pat. No. 8,170,424.

(51) Int. Cl.
  *H04J 14/02* (2006.01)
  *H04B 10/00* (2006.01)
  *H04B 10/04* (2006.01)
(52) U.S. Cl. ........... 398/195; 398/93; 398/196; 398/158
(58) Field of Classification Search ............ 398/33, 398/93, 94, 82, 147, 158, 195–198
  See application file for complete search history.

(56) References Cited

U.S. PATENT DOCUMENTS

| | | | |
|---|---|---|---|
| 3,815,045 A | 6/1974 | Ito | |
| 4,471,494 A | 9/1984 | Keil et al. | |
| 4,561,119 A | 12/1985 | Epworth | |
| 4,709,416 A | 11/1987 | Patterson | |
| 5,020,153 A | 5/1991 | Choa et al. | |
| 5,339,370 A | 8/1994 | Sano et al. | |
| 5,850,408 A | 12/1998 | Ouchi et al. | |
| 6,175,672 B1 | 1/2001 | Newberg et al. | |
| 6,509,990 B1 | 1/2003 | Roberts | |
| 6,721,081 B1 * | 4/2004 | Mauro et al. | 359/279 |
| 7,035,486 B2 * | 4/2006 | Griffin et al. | 385/3 |
| 7,164,863 B2 | 1/2007 | Lange et al. | |
| 7,369,715 B2 | 5/2008 | Darcie et al. | |
| 7,603,007 B2 * | 10/2009 | Terahara et al. | 385/24 |
| 7,657,179 B2 | 2/2010 | Mahgerefteh et al. | |
| 7,663,762 B2 | 2/2010 | Mahgerefteh et al. | |
| 2004/0037525 A1 | 2/2004 | Shahar et al. | |
| 2005/0003652 A1 | 1/2005 | Ramanaathan et al. | |
| 2006/0202110 A1 | 9/2006 | Karlquist | |
| 2010/0202783 A1 | 8/2010 | von Lerber et al. | |

FOREIGN PATENT DOCUMENTS

JP             2003115800 A      4/2003

OTHER PUBLICATIONS

Rajiv Ramaswami et al., "Optical networks a practical perspective", Third edition 1998, pp. 85-89.

\* cited by examiner

*Primary Examiner* — Dalzid Singh
(74) *Attorney, Agent, or Firm* — Scully, Scott, Murphy & Presser, P.C.; Yuanmin Cai

(57) ABSTRACT

An optical signal transmitter of direct modulation, a method for transmitting optical signals, and an optical network are provided. The optical signal transmitter includes a laser diode operating at a bias current above a lasing threshold of the laser diode; a modulating device applies a modulation signal to the diode to produce a first output optical signal having first and second signal power levels; and a power level discriminator. The power level discriminator, from the received first output optical signal, generates a second output signal of significantly improved extinction ratio by reducing power of one of the first and second signal power levels of the first output optical signal. In one aspect, prior to receipt at the power level discriminator device, the second power level of the first output optical signal ranges from 10% to 60% of the first power level, and the second power level of the second output optical signal is reduced to less than 10% of the first power level of the second output optical signal.

25 Claims, 7 Drawing Sheets

HIGH SPEED OPTICAL TRANSMITTER WITH DIRECTLY MODULATED LASER SOURCE

CROSS-REFERENCE TO RELATED APPLICATIONS

This application is a continuation-in-part application of commonly-owned, co-pending U.S. patent application Ser. No. 12/496,835 filed Jul. 2, 2009 entitled METHOD AND APPARATUS FOR OPTICAL SIGNAL POWER DISCRIMINATION the whole content and disclosure of which is incorporated by reference herein.

FIELD OF THE INVENTION

The present invention relates to a system and method of using directly modulated laser source in optical transponders and/or optical transmitters incorporating an optical signal power handling device that discriminates optical signal states of different optical signal power levels.

BACKGROUND

In high-speed optical signal transmission, distortion of waveform of digital optical signal occurs due to various factors, and particularly due to dispersion of the transmission media such as the optical fiber. The amount of waveform distortion normally increases when the optical source of signal is accompanied by large amount of unwanted and usually unmanageable frequency shift, also known as chirp, across its transmitting waveform. This is due to the fact that different frequency components of the optical signal, in particular when being loaded with undesirable frequency shift, will propagate across a fiber media at different speed, causing edges of the waveform to gradually smear and eventually become unrecognizable at its intended destination by an optical receiver.

This phenomenon manifests itself most severely in directly modulated laser signal. In a directly modulated laser signal, there exists large amount of un-manageable chirps across its waveform. The resulting waveform distortion causes inter-symbol-interference (ISI) in digital optical signal transmission, creates receiver sensitivity degradation, and ultimately limits the reachable transmission distance for the optical signal.

For example, FIG. 1 illustrates a directly modulated optical signal source as is known in the art. The optical signal source normally employs a directly modulated laser diode (DM-LD) 11. Optical data signal output from laser diode 11 is coupled to optical fiber 10 for transmission. During operation, laser diode 11 is normally biased at around its lasing threshold point 30 which is a point in the L-I curve (optical power versus drive current) between linear operational region 32 and laser shut off region 31 as being illustratively shown in FIG. 1. An electrical data signal 21 is applied to modulate laser diode 11, which is normally superimposed onto the bias current at bias point 30 of laser diode 11. Laser diode 11 thus converts input electrical data signal 21 into an output optical data signal 12. Because laser diode 11 is being turned on-and-off around its threshold point 30 for lasing to generate optical data signal 12, a large amount of unwanted and usually unmanageable chirps or frequency shifts may be created, particularly around the "0" state of optical data signal 12. The chips ride with optical data signal 12 and propagate down fiber link 10 with optical data signal 12 causing waveform distortion. In addition, in a directly modulated laser source, conversion of electrical data signal 21 to optical data signal 12 follows the L-I curve of laser diode 11. Since the conversion curve is not exactly linear (31, 32) around threshold point 30, the optical data signal 12 may not truly represent the waveform of electrical data signal 21, causing waveform being distorted at the transmitting side as well.

Due to the existence of large amount of unwanted and un-manageable chirp, directly modulated laser signal sources are generally considered as not being suitable for high-speed, and/or long distance transmission, and therefore are usually used in relatively low speed, for example, 2.5 Gb/s or below data communications, and/or in signal transmission of relatively short distances.

In order to achieve high-speed, for example 10 Gb/s and beyond, optical signal transmission and reach long distances, the state-of-art technology is to modulate a CW (continuous wave) optical signal by using an external modulator. The type of external modulators may include, for example, $LiNbO_3$ or III-V semiconductor based Mach-Zehnder type modulator and electro-optic absorption type modulator. These types of modulators, in particular a $LiNbO_3$ Mach-Zehnder modulator with the high cost associated therewith, have been shown to be able to effectively manage and in certain cases tailor the frequency chirp to meet particular optical signal transmission needs.

SUMMARY

It would be desirable to provide an optical transponder or transmitter device that employs directly modulated laser source and is able to manage and minimize the amount of unwanted frequency chirp for high speed and long distance optical signal transmission.

In one aspect, the amount of unwanted frequency chirp, which is normally associated with direct laser modulation, is managed and/or minimized through proper adjustment of a bias point for the laser. More specifically, the laser may be biased at a point sufficiently away from its normal lasing threshold, thus avoiding creation of at least some of the unwanted chirps which may be attributed to the laser working around its threshold point. In addition, by biasing the laser at high above its lasing threshold, the laser may be working in a more linear region, and thus able to provide higher fidelity to the original modulating signal.

The associated signal degradation in extinction ratio, due to a non-zero signal power at the "0" signal level caused by the bias adjustment, may be restored and/or improved by subjecting the optical signal to an optical power level discriminator at the output of laser source.

Thus, in one aspect, there is provided a method comprising: biasing a laser diode at a bias current above a lasing threshold of the laser diode; applying a modulation signal to the laser diode to produce a first output optical signal having first and second signal power levels corresponding to first and second signal states; splitting the first output optical signal into first and second branch signals; providing a first phase shift to the first signal state of the first branch signal; providing a second phase shift to the second signal state of the first branch signal; and, combining the first branch and second branch signals to produce a second output optical signal, the combining causing a constructive interference between the first signal states of the first and second branch signals, and a destructive interference between the second signal states of the first and second branch signals, resulting in a new set of first and second signal power levels, wherein the second output optical signal exhibits an improved extinction ratio represented by the new set of first and second signal power levels over that of the first output optical signal.

In a further aspect, there is provided an optical signal transmitter comprising: a laser diode operating at a bias current above a lasing threshold of the laser diode; a modulating device for applying a modulation signal to the laser diode to produce a first output optical signal having first and second signal power levels corresponding to first and second signal states; and, a power level discriminator for improving an extinction ratio of the first output optical signal received from the laser diode, the power level discriminator comprising: a splitter for receiving the first output optical signal, and splitting the received first output optical signal into a first branch signal and a second branch signal; a first optical signal path, attached to a first output port of the splitter, for transporting the first branch signal, the first optical signal path providing a first phase shift to the first signal state of the first branch signal and a second phase shift to the second signal state of the first branch signal, wherein the first phase shift is different from the second phase shift; a second optical signal path, attached to a second output port of the splitter, for transporting the second branch signal; and a combiner having a first and a second input port being attached to the first optical signal path and the second optical signal path respectively, the combiner combining the first branch signal and the second branch signal to produce a second output optical signal, the second output optical signal being resulted from a constructive interference between the first signal states of the first and second branch signals, and a destructive interference between the second signal states of the first and second branch signals and having a new set of first and second signal power levels.

According to a further aspect, there is provided an optical network having one or more optical network nodes interconnected by at least one optical signal fiber, the network comprising: at least a first optical network node including a transmitting device for transmitting an optical signal along an optical fiber for receipt at a second optical network node by a receiving device, wherein the transmitting device comprises: a laser diode operating at a bias current above a lasing threshold of the laser diode; a modulating device for applying a modulation signal to the laser diode to produce a first output optical signal having first and second signal power levels corresponding to first and second signal states respectively; and, a power level discriminator device receiving and reshaping the first output optical signal, the power level discriminator device comprising: a splitter for receiving the first output optical signal, and splitting the received first output optical signal into a first branch signal and a second branch signal; a first optical signal path, attached to a first output port of the splitter, for transporting the first branch signal, the first optical signal path providing a first phase shift to the first signal state of the first branch signal and a second phase shift to the second signal state of the first branch signal, wherein the first phase shift is different from the second phase shift; a second optical signal path, attached to a second output port of the splitter, for transporting the second branch signal; and a combiner having a first and a second input port being attached to the first optical signal path and the second optical signal path respectively, the combiner combining the first branch signal and the second branch signal to produce a second output optical signal, the second output optical signal being resulted from a constructive interference between the first signal states of the first and second branch signals, and a destructive interference between the second signal states of the first and second branch signals and having a new set of first and second signal power levels, wherein the second output optical signal, having a new set of first and second signal power levels, is received at the second optical network node by the receiving device.

BRIEF DESCRIPTION OF THE SEVERAL VIEWS OF THE DRAWINGS

Other aspects, features and advantages of the present invention will become more fully apparent from the following detailed description, the appended claims, and the accompanying drawings in which similar elements are given similar reference numerals.

DETAILED DESCRIPTION

Figure 1:
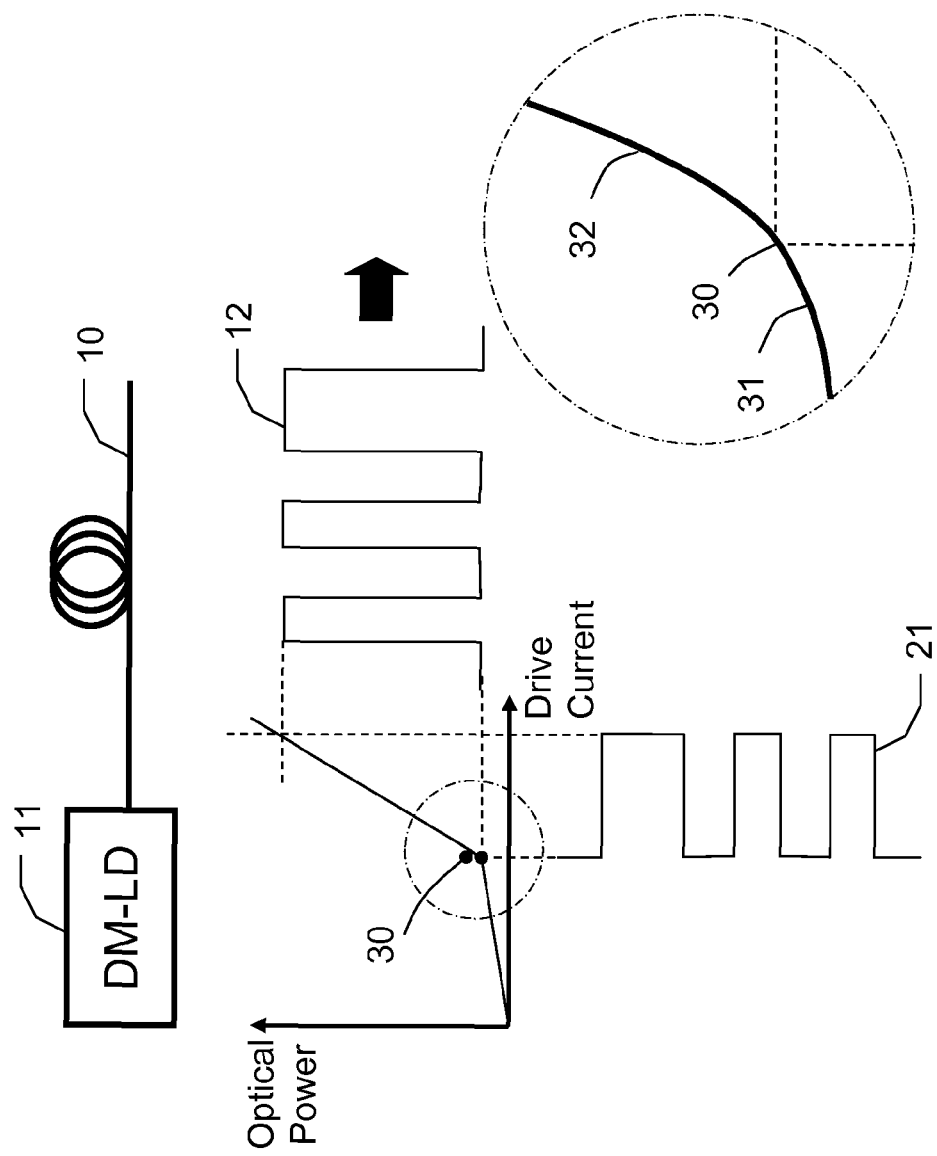
FIG. 1 illustrates a directly modulated optical signal source as is known in the art.
Figure 2:
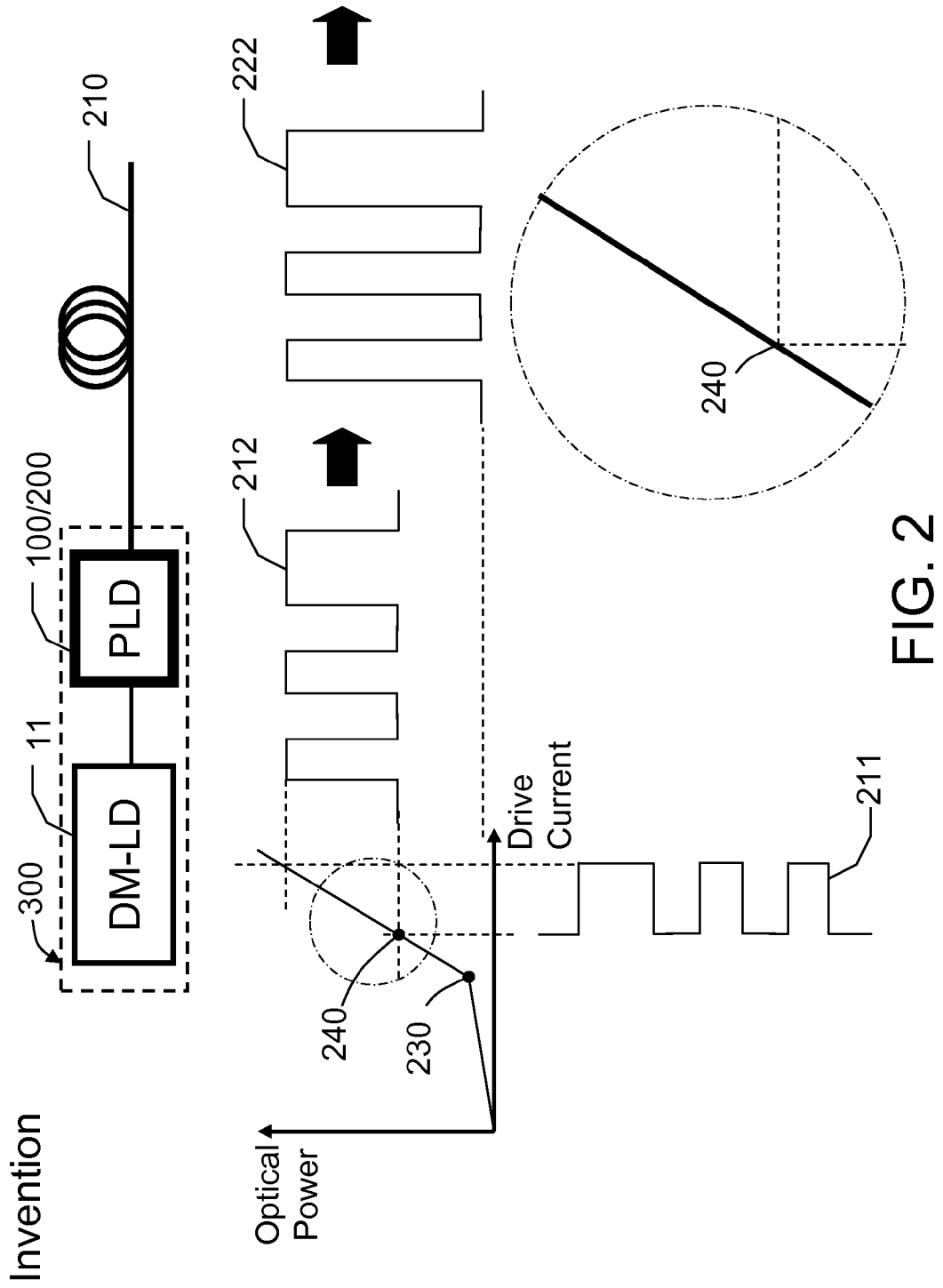
FIG. 2 illustrates a demonstrative configuration of an optical signal transmission system in accordance with one embodiment.

FIG. 2 illustrates a demonstrative configuration of an optical signal transmission system in accordance with one embodiment of the invention. Optical signal transmission system includes an optical signal transponder or transmitter 300 including a direct modulated power source, e.g., a directly modulated laser diode (DM-LD) 11 that provides a modulated optical signal to a power level discriminator (PLD) 100/200 such as the PLD described in herein-incorporated, commonly-owned, co-pending U.S. patent application Ser. No. 12/496,835. The PLD 100/200 provides signal processing, such as reshaping of the modulated optical signal received from DM-LD 11, and subsequently launches the reshaped optical signal to optical fiber 210 for transmission in an optical communication network. It is understood that optical transmitter or transponder 300 may further include other optical components and/or electronic circuitry not shown in FIG. 2, for example, components for coupling optical signals between DM-LD 11 and PLD 100/200 as well as into optical fiber 210.

In one embodiment, as shown in FIG. 2, there is applied a voltage or current bias to the laser diode 11 in a strategic manner of bias point selection. In one aspect, the voltage or current bias to the laser diode 11 is applied at above its normal lasing threshold when the laser diode is being used for generating optical data signal for digital communication. That is, laser diode 11 is biased at a bias point 240, above and away from its normal threshold point 230, during operation. A much smaller electrical data (modulating) signal 211 may now be used to drive laser diode 11 to produce output optical data signal 212.

During operation, in one embodiment, the laser diode is not turned-off at a "0" level or "0" state of data signal, as compared with a traditional scheme of direct modulation, but rather at a reduced optical output power. Except a reduced extinction ratio due to the non-zero "0" logic level of the output optical signal, which may be improved by the use of PLD 100/200 as being described below in more details, applying laser bias at above its threshold generally improves management of undesirable chirps caused by laser operating at around threshold point, which is known to limit the operational speed of a traditional direct modulation laser source. The laser is now able to operate in a more linear region, which helps preserve fidelity of the input electrical data signal and thereby optical output signal 212 of laser diode 11 is able to better preserve the waveform of input electrical signal 211. The laser may also be operated at a much higher speed, which was previously limited by the concern of accompanying unwanted chirp.

As to the reduced extinction ratio of optical signal 212, it may be compensated and/or improved by the use of power level discriminator (PLD) 100/200. For example, output optical signal 212, at the output of DM-LD 11, may have a non-zero "0" logic signal level which may vary from around 10~60% (e.g., between 40% and 50%) of the "1" logic signal level, corresponding to an extinction ratio approximately between 3~10 dB. By launching optical signal 212 into power level discriminator 100/200, as described in commonly-owned, co-pending U.S. patent application Ser. No. 12/496,835, power level discriminator 100/200 may reduce, and ideally eliminate, the optical power of one of the input optical signal levels, for example the "0" level signal, and as a result produce an output optical signal 222 which represents optical signal 212 with restored and/or improved extinction ratio. In one example, optical signal 222 exhibits restored and/or improved extinction ratio of, for example, 13~20 dB or higher. Optical signal 222 may be subsequently coupled or launched into fiber 210 for transmission as shown in FIG. 2.

According to embodiment of present invention, various types of optical power level discriminators may be used in connection with the use DM-LD 11 to provide a directly modulated laser source for optical signal transmission. A person skilled in the art will appreciate that embodiments of the present invention are not limited to the below described particular power level discriminator, and other types of power level discriminator may be used as well.

Figure 3:
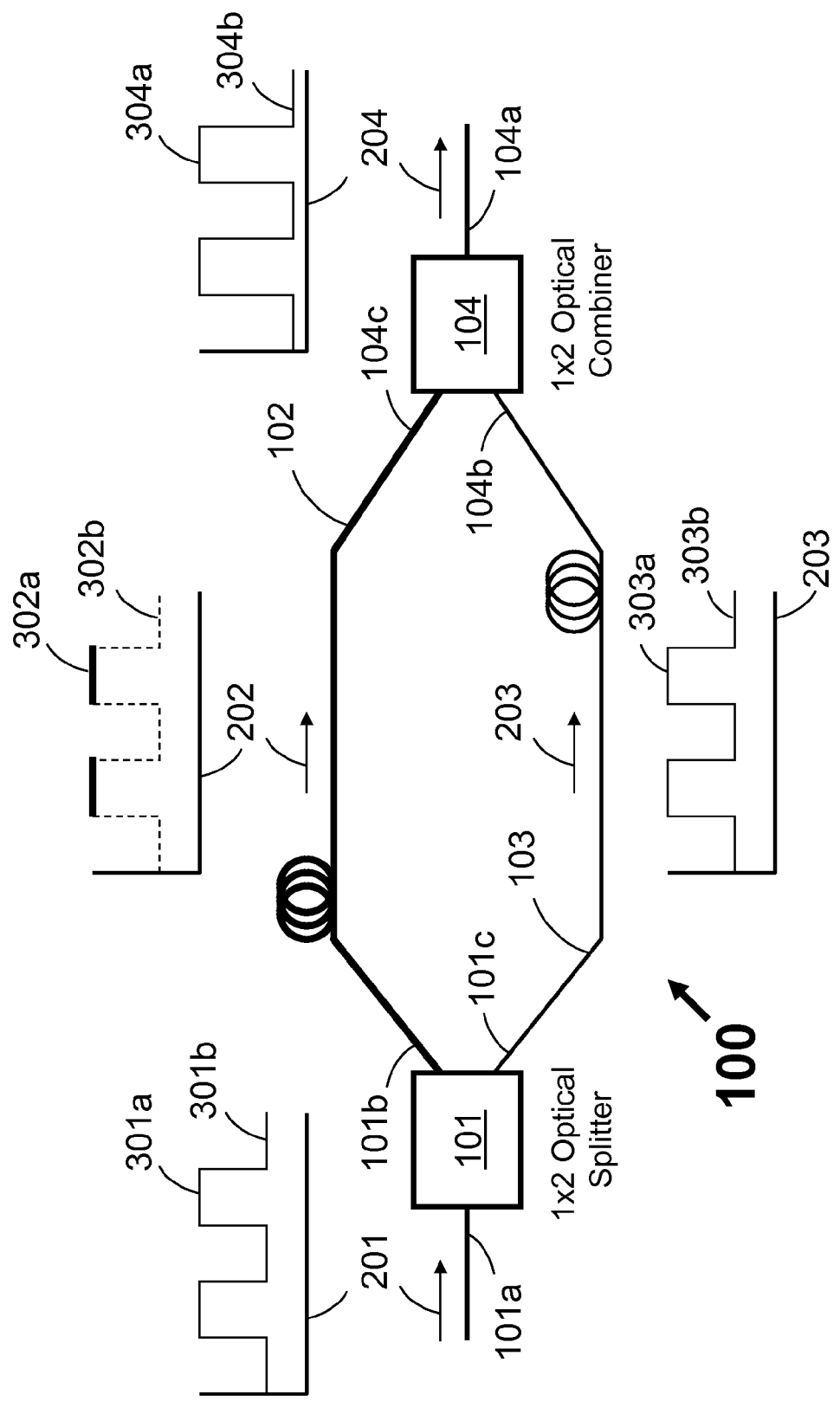
FIG. 3 illustrates a demonstrative configuration of an optical signal power level discriminator 100 employed in an optical signal transmitter in accordance with one embodiment.

FIG. 3 illustrates a demonstrative configuration of an optical signal power level discriminator 100 which may be employed in a directly modulated optical signal transmitter in accordance with one embodiment of present invention. Optical power discriminator apparatus 100 includes: an input optical splitting device 101, which may be a 1×2 optical splitter in the embodiment depicted, having one input port 101*a* and two output ports 101*b*, 101*c*; and an output optical combining device 104, which may be a 1×2 optical combiner in the embodiment depicted, having two input ports 104*b*, 104*c* and one output port 104*a*. A first optical signal path 102, which may be a first optical fiber for example, connects a first output port 101*b* of optical splitting device 101 to a first input port 104*c* of optical combining device 104, and a second optical signal path 103, which may be a second optical fiber for example, connects a second output port 101*c* of optical splitting device 101 to a second input port 104*b* of optical combining device 104.

It should be understood that, the optical splitter 101 and combiner 104 are both bi-directional devices. That is, a splitter becomes a combiner when light/optical signal inside propagates in the opposite direction. Additionally, as known, splitter 101 and/or combiner 104 may be made of, for example, directional couplers, Y-branches, etc.

In further view of FIG. 3, optical fiber 102 preferably has a high optical intensity dependent refractive index, commonly known as non-linear refractive index. Optical fiber 103 preferably has a low non-linear refractive index, or a refractive index that is less dependent on optical intensity. Further, alternately, optical fiber 102 may have a relatively small cross-sectional area, which may create a higher optical intensity under a certain input optical power, thereby enhancing its non-linear effect on an optical signal propagating therein, and optical fiber 103 may have a relatively big cross-sectional area, which may cause a lower optical intensity under the same amount of input optical power as that in optical fiber 102, thereby having lower or no non-linear effect on an optical signal propagating therein.

Optical splitting device 101 (or splitter) and combining device 104 (or combiner) may be configured to have various combinations of power splitting and/or combining ratios. For example, in one embodiment, the optical splitting device 101 and combining device 104 may both be a 50:50 splitter and combiner. In this embodiment, because optical powers propagating inside fibers 102 and 103 are the same (absent other power altering devices, like an amplifier and/or an attenuator as being described below in connection with alternate embodiments), optical fibers 102 and 103 may be different, having either different non-linear refractive indices or cross-sectional areas for example, to have different amount of non-linear effect and, as a result, provide different amount of phase shifts to optical signals propagating therein, respectively, as being described below in more detail.

In an alternate embodiment, optical splitter 101 may be, for example, a 80:20 splitter with 80% of the signal power to/from (first) output port 101*b*. In this case, optical combiner 104 may be a 20:80 (inverse ratio of splitter 101) combiner, with 20% of the signal power from/to (first) input port 104*c*, which is connected to first output port 101*b* of optical splitter 101 through optical signal path 102. In general, if the power splitting ratio of splitter 101 is x:y, then the power combining ratio of combiner 104 shall be y:x, assuming losses of first optical signal path 102 and second optical signal path 103 to optical signals are substantially the same. This way, inside combiner 104, same amount of optical powers may come from first optical signal path 102 (or first optical fiber) and from second optical signal path 103 (or second optical fiber) to create constructive interference at a logic "1" signal level or state and destructive interference at a logic "0" signal level or state, as being described below in more detail.

In further view of FIG. 3, in operation, an optical signal 201 may be launched into input port 101*a* of splitter 101. Signal 201 may be a directly modulated optical signal from DM-LD 11 being launched into PLD 100 as illustrated in FIG. 2. For the purposes of below discussion, signal 201 is a binary signal and may be represented by a series of pulses with a first state 301*a* (representing a logic "1") and a second state 301*b* (representing a logic "0"). As shown in FIG. 3, second state 301*b* may contain certain amount of optical power (a ground level noise, for example) and is thus not a true "0" state. In other words, optical signal 201 exhibits a poor extinction ratio (i.e., a low ratio of optical power of "1" state over "0" state), similar to optical signal 212 coming out of DM-LD 11 in FIG. 2. Inside splitter 101, input optical signal 201 is split into first branch signal 202 propagating via splitter output port 101*b* along optical fiber 102, and second branch signal 203 propagating via splitter output port 101c along optical fiber 103.

Given the example description of input optical signal 201 being split into two branch optical signals 202 and 203, the following occurs: branch optical signal 202 propagating inside fiber 102, which has a large non-linear refractive index that is optical signal intensity dependent, is subject to a self-phase modulation (SPM) inside fiber 102 that may cause different states ("1" and "0") of optical signal 202, at different power levels, to experience different non-linear phase shifts ("first" and "second" phase shifts). According to one embodiment, difference in phase shift between "1" state 302a and "0" state 302b of signal 202 shown in FIG. 3 may amount to 180 degrees, or 180+N×360 degrees, where N is a whole number. In other words, "1" state 302a and "0" state 302b may become "out-of-phase", represented by the dark solid line and the light dashed line in FIG. 3. On the other hand, branch optical signal 203 propagating inside fiber 103, which has a small non-linear refractive index, may experience little or no non-linear phase shift. In other words, "1" state 303a and "0" state 303b of branch optical signal 203 may experience or accumulate zero phase difference and remain "in-phase", represented by the same solid line style.

As mentioned in view of FIG. 3, optical combiner 104 may combine branch optical signals 202 and 203 to produce an output optical signal 204 which exits via output port 104a of combiner 104. When the "1" state 302a of branch optical signal 202 is arranged to be in-phase with the "1" state 303a of branch optical signal 203, constructive interference between the two "1" states occurs which may produce a "1" state 304a of output optical signal 204. According to one embodiment of the invention, phase adjustment between branch optical signals 202 and 203 may be achieved by adjusting the length of optical fiber 102 and/or 103, and/or using a phase shifter as being described below in more details with reference to FIG. 4.

In the meantime, there occurs destructive interference between "0" state 302b of branch optical signal 202 and "0" state 303b of branch optical signal 203 since they are out-of-phase, which may produce a largely diminished "0" state 304b of output optical signal 204. The amount of power in "0" state 304b of output optical signal 204 is generally smaller than that of "0" state 301b of input optical signal 201, and in the ideal condition may become a true "0", indicating that signal 204 has an improved extinction ratio which is general preferably for reducing error-rate during signal detection.

In one embodiment, optical signal path 102 may be an optical fiber made of materials with high non-linear refractive index. Miller's rule, which is a semi-empirical relation for predicting nonlinearity, implies that a high linear refractive index generally leads to large non-linear (Kerr) refractive index. In the embodiment depicted, materials making optical fiber 102 may include, for example, a chalcogenide glass having a rather large refractive index, i.e., larger than 2 and in one instance between 2 and 3. As known, chalcogenide glass materials exhibit significantly larger non-linear refractive indices than other glasses. Typically, their non-linear refractive indices in the telecommunication C-band (~1550 nm) are about two to three orders of magnitude greater than that of fused silica. Chalcogenide glasses suitable for making optical fiber 102 may generally include chalcogen elements including, but not limited to, sulfur, selenium and tellurium and may be combined with one or more other elements, commonly germanium, silicon, phosphorous, arsenic and antimony.

The amount of non-linear phase shift an optical signal may experience while propagating inside an optical fiber may be estimated by equation (1) as follows:

$$\Phi = r * P * L \quad (1)$$

Here, r is a nonlinearity coefficient that is proportional to the nonlinear-index coefficient $n_2$ of the fiber material, and inversely proportional to the effective cross-sectional area $A_{eff}$ of the fiber. In a typical fused fiber, r may be about 20 $W^{-1}km^{-1}$. In the above equation, P is the optical signal power; and L is the fiber length. Thus, for example, in order to achieve a phase shift $\Phi=\pi$ under an input optical power condition of 20 mW and inside a regular fused fiber, an optical fiber length of around 8 km would be sufficient. If a fiber of higher non-linear index is used (such as the chalcogenide glass above whose non-linear refractive index is 2~3 orders of magnitude larger), the required fiber length may become much less.

Figure 4:
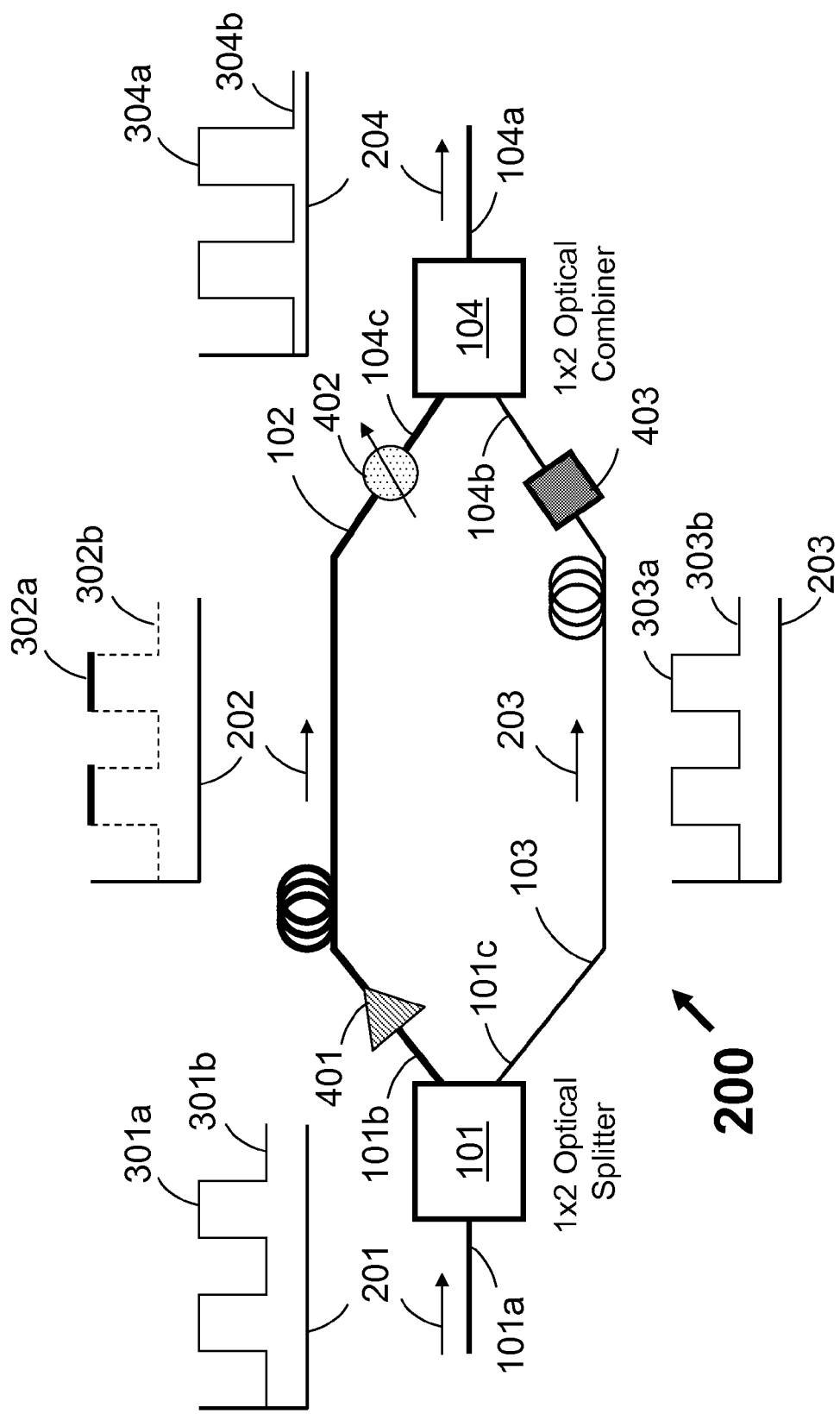
FIG. 4 illustrates several alternative configurations of optical signal power level discriminators according to another embodiment.

FIG. 4 illustrates alternative configurations of optical signal power level discriminators according to other embodiments. As shown in FIG. 4, power level discriminator 200 includes, along optical signal paths 102 and/or 103 connecting splitter 101 and combiner 104, one or more optical amplifier, attenuator and/or phase shifter devices. Each of the amplifier, attenuator and phase shifter elements may be used individually or in different combination with the configuration shown in FIG. 4 as one possibility.

An optical amplifier, such as optical amplifier 401 connected at the output port 101b of splitter 101, may be used to boost the optical signal power level launched into optical fiber 102 in order to enhance the non-linear effect of self-phase modulation (SPM) that branch optical signal 202 experiences inside optical fiber 102. That is, an amplifier connecting an output of the splitter to the first optical fiber boosts the power of the first and second signal states of the first branch signal, thereby enhancing a non-linear effect of the first optical fiber 102.

As further shown in FIG. 4, an attenuator 402 may be used to adjust the optical power level from fiber 102 into combiner 104 in such a way that a correct amount of power may be used to enable the constructive (for logic "1" state) or destructive (for logic "0" state) interference with signals coming from fiber 103. Attenuator 402 may be used in combination with the combining ratio of combiner 104. Although attenuator 402 is illustratively shown in optical signal path 102 or optical fiber 102 in FIG. 4, it may be placed in optical signal path 103 depending upon the actual need of power adjustment.

Additionally, a linear phase shifter 403 may be used to ensure and/or adjust the phase shift of optical signal 203 in fiber 103 such that logic "1" state 303a of optical signal 203 in fiber 103 is substantially "in-phase" (having a phase difference substantially close to zero or N×360 degrees with N being a whole number) with logic "1" state 302a of optical signal 202 in fiber 102. In other words, logic "0" state 303b of optical signal 203 in fiber 103 is also substantially "out-of-phase" with logic "0" state 302b of optical signal 202 in fiber 102. As being described above, logic "1" state 302a of optical signal 202 is "out-of-phase" with logic "0" state 302b of optical signal 202 because of non-linear phase shift. That is, the linear phase shifter may be employed for adjusting a phase shift of the first and second signal power levels of the second branch signal in the second optical fiber 103, thereby causing the constructive interference between said first signal states of the first and second branch signals, and the destructive interference between the second signal states of the first and second branch signals.

Figure 5:
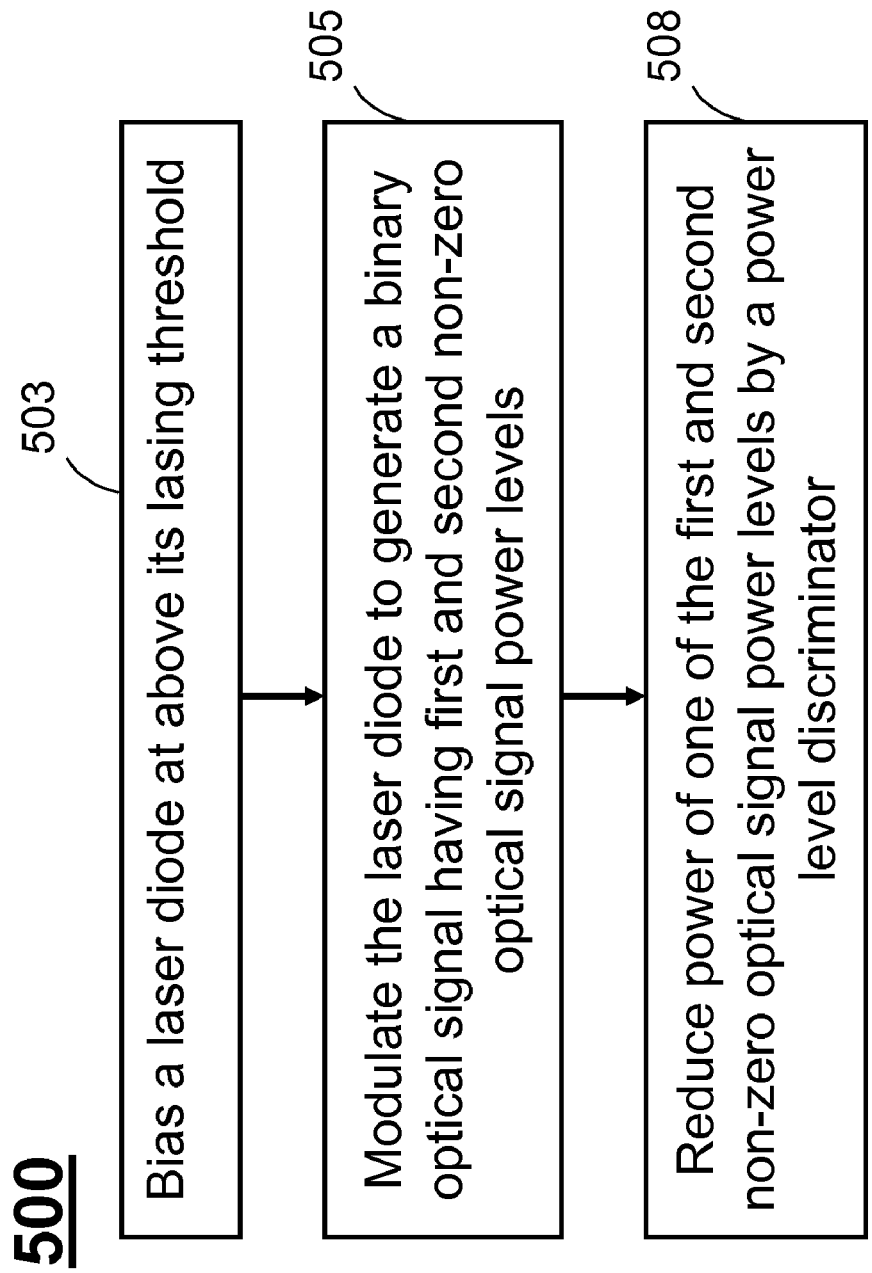
FIG. 5 depicts a flowchart illustrating a method 500 of generating a binary optical signal according to one embodiment.

FIG. 5 depicts a flowchart illustrating a method 500 of generating a digital, for example binary, optical signal according to one embodiment. In the method, as shown at step 503, there is performed the biasing of the laser diode 11 such as shown in FIG. 2. The biasing of laser diode 11 is preferably above, and sufficiently away from lasing threshold point. Then, at 505, there is performed modulating the laser diode 11 to generate a binary optical signal (e.g., a digital data signal) having first and second non-zero optical signal power levels. In one embodiment, for example, the step may include applying a modulation signal to the laser diode to produce an output optical signal having first and second signal power levels, wherein the first signal power level corresponds to a "1" level signal and the second signal power level corresponds to a "0" level signal, and the second signal power level is at around 10% to 60% of that of the first signal power level, preferably around a level that is sufficiently away from the lasing threshold point to avoid creating frequency chirp normally associated with conventional direct modulation. Then, at 508, there is performed reducing the power of one of the first and second non-zero optical signal power levels, thereby improving an extinction ratio between the first and second signal power levels, by subjecting the optical signal to a power level discriminator as being described above with reference to FIG. 3 and/or FIG. 4. In one embodiment, with the use of a power level discriminator with power level discriminator 100 or 200 as examples, the power of the second signal power level may be reduced to less than 5-10%, and potentially less than 1%, of that of the first signal power level, resulting in an improved extinction ratio of between 13 to 20 dB or even bigger.

Figure 6:
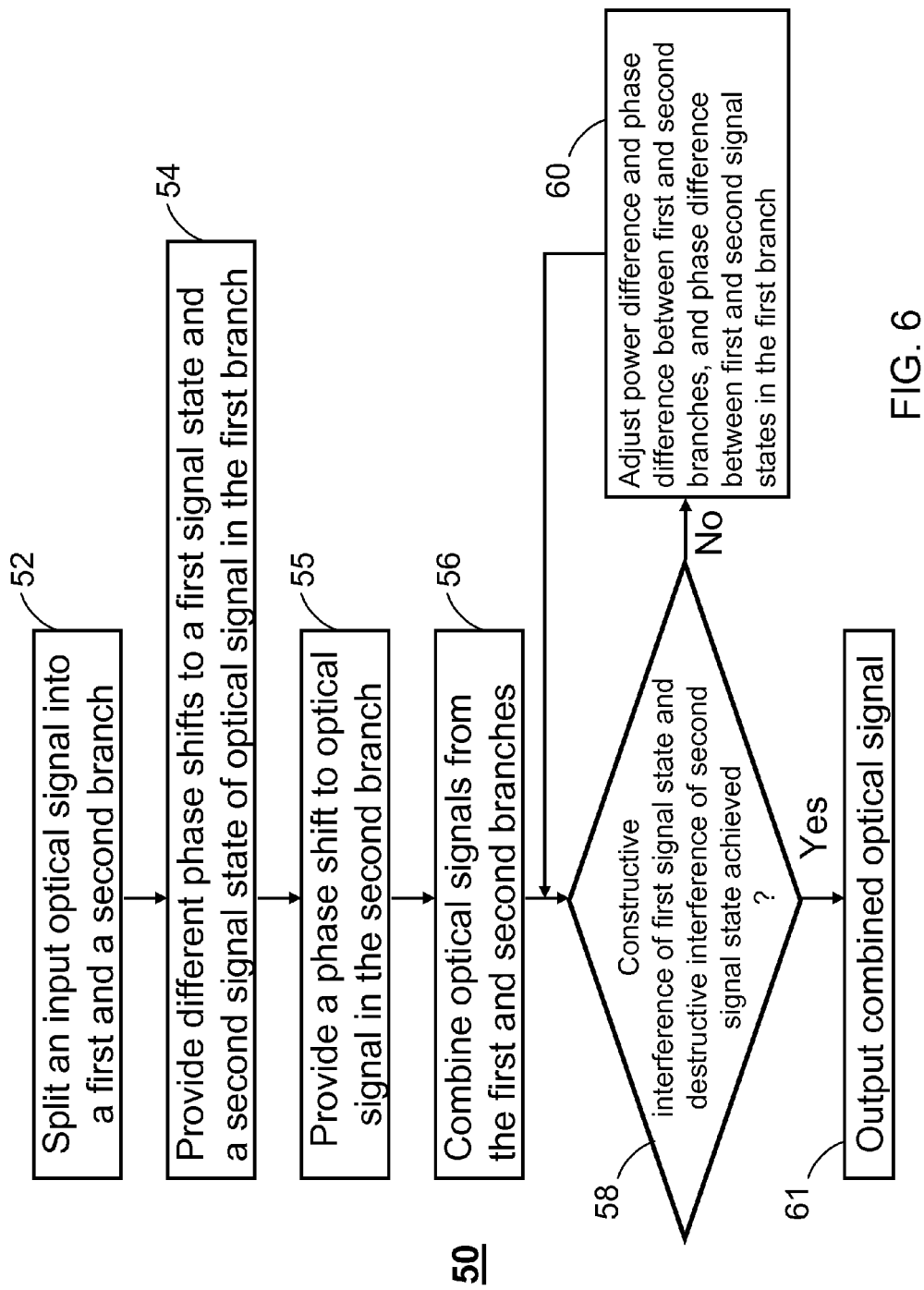
FIG. 6 depicts a simplified flowchart of a method employed in an optical signal power level discriminator for processing binary modulated optical signals to create constructive interference of optical logic "1" state and destructive interference of optical logic "0" state, in an example embodiment; and, FIG. 7 depicts a demonstrative optical network employing an optical transmitter including the optical signal power level discriminator for reshaping optical signal for improved extinction ratio.

FIG. 6 depicts a flowchart illustrating a method 50 implemented by optical signal power level discriminator for creating constructive interference of optical logic "1" state and destructive interference of optical logic "0" state of an optical signal input from the directly-modulated laser diode. As shown in FIG. 6, method 50 includes a step 52 of splitting the input optical signal into first and second branch signals. The splitting may be made according to a power split ratio x:y, where x is the amount of input power being split and/or launched into a first branch optical signal path (e.g., fiber 102) and y is the amount of input power being split and/or launched into a second branch optical signal path (e.g., fiber 103). Then, at step 54, the method includes a step of providing different phase shifts to a first signal state, e.g., logic state "1", and a second signal state, e.g., logic state "0", of the first branch signal. The amount of non-linear phase shift Φ being provided may be dependent on the power levels of different signal states being launched into non-linear optical signal path 102. For instance, in one application, the difference of non-linear phase shift being provided to the logic state "1" and the logic state "0" may be substantially close to 180 degrees or N×360 degrees, where N is a whole number.

FIG. 6 further includes a step 55 of optionally providing a linear phase shift to the branch signal in the second optical signal path (e.g., optical fiber 103). This phase shift may be equally applied to both the logic "1" state and the logic "0" state of the branch signal 203. The linear phase shift may be applied to make logic "1" state 303a of branch signal 203 "in-phase" with logic "1" state 302a of branch signal 202, and logic "0" state 303b of branch signal 203 "out-of-phase" with logic "0" state 302b of branch signal 202.

Continuing at step 56, the method may include a further step of combining the branch signals (or branch optical signals) 202 and 203, carried by the first and second optical signal paths 102 and 103, to produce an output optical signal 204 (FIG. 3 and FIG. 4). Then, at a following step 58, a determination is made on whether proper constructive interference of the logic "1" signal state ("first signal state") and destructive interference of the logic "0" signal state ("second signal state") have been achieved.

If it is determined that constructive and/or destructive interference have been not properly achieved yet, then the method proceeds to a next step 60.

In order to achieve both desirable constructive interference for logic "1" signal state and desirable destructive interference for logic "0" signal state, it may be necessary, at step 60, to adjust the power levels and/or individual phase shift of the two interfering branch optical signals, as well as the phase difference between the two signal states "1" and "0" of one of the branch optical signal. This may be accomplished by the use of one or more optical amplifier, attenuator and/or phase shifter devices in the branch optical signal paths such as those shown in the embodiment depicted in FIG. 4, and by adjusting and/or carefully selecting the type of fiber used and the length used, if the optical signal paths are optical fibers.

For example, in order to achieve a certain phase difference between logic state "0" and logic state "1" of optical signal 202 in fiber 102, the non-linear effect of SPM may be adjusted by either using an amplifier to increase or using an attenuator to decrease the level of optical signal power launched into optical fiber 102, and/or by selecting the type of fiber with proper non-refractive index and the length of fiber to accumulate a proper non-linear phase shift. Further for example, a phase shifter, preferably a linear phase shifter, may be used in one of the branch optical signal paths, either 102 or 103, to achieve "in-phase" status (e.g., substantially close to zero, or N×360 degrees, where N is a whole number) of logic "1" states of branch optical signals 202 and 203, or "out-of-phase" status (e.g., substantially close to 180 degrees, or 180+N×360 degrees, where N is a whole number) of logic "0" states of branch optical signals 202 and 203 to ensure constructive interference at logic state "1" and destructive interference at logic state "0" of optical signals 202, 203. It should be understood that steps 58 and 60 may be repeated by looping as shown in FIG. 6, in order to reach a pre-determined quality of optical signal for the particular application. Finally, the combined optical signal is output at step 61.

Figure 7:
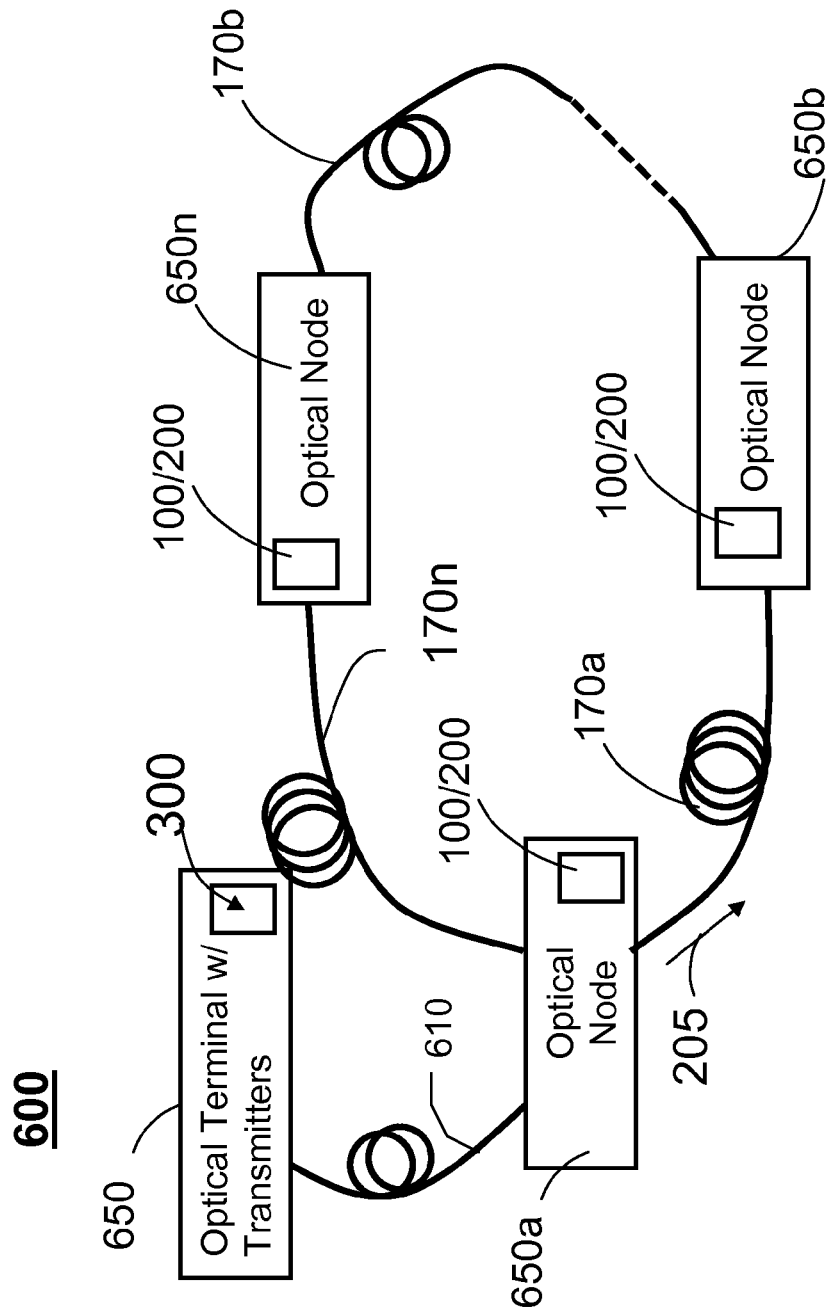

FIG. 7 depicts a simplified optical network 600 comprising optical transmitters and/or optical transport nodes 650, 650a, 650b, . . . , 650n for transmitting and/or receiving optical signals and in particular, for example, optical digital signals via optical fiber spans 610, 170a, 170b, . . . , 170n. At least one of the optical transmitters and/or optical transport nodes may include the optical signal transmitter 300 of FIG. 2 according to one embodiment of the present invention. For example, in the embodiment depicted, network node or terminal 650 may include optical signal transmitter 300 having the DM-LD 11 and the optical power level discriminator 100 (FIG. 3) or 200 (FIG. 4) such as described herein above. In one embodiment, such as shown in FIG. 7, optical signal transmitter 300 launches or otherwise transmits a digitally modulated optical signal via optical fiber span 610 or like optical signal transmission media to the optical network 600, in the manner described herein. In one embodiment, the optical signal is received by an optical power level discriminator 100/200 at a first node 650a, for example, that is configured to enhance the extinction ratio of optical signals being received. An improved or reshaped optical signal 205 may then be launched into optical fiber spans 170a to propagate towards other optical nodes 650b, . . . , 650n in network 600, which may be a linear-type, a ring-type, or a mesh-type optical network. One or more of the optical nodes in the network may have one or more optical transponder devices employing optical power level discriminator 100/200 with optical signal power level handling capability, as described herein. For example, as shown in FIG. 7, each of the optical nodes 650a, 650b, . . . , 650n in the network may receive optical signals via interconnecting optical fiber and are configured to enhance the extinction ratio of optical signals 205 being received, according to one embodiment of the present invention.

Normally, as an optical signal propagates through an optical transmission media such as a fiber, various noises may be added onto the optical signal. The optical signals can only be detected at above a certain signal-to-noise ratio often due to limitation in receiver sensitivity. In addition, the optical transmission media such as fiber may also induce dispersion to cause pulse spread of the digital optical signal, which further degrades the receiver sensitivity. Both noise and dispersion increase with the increase in transmission distance and are generally more pronounced at higher data rates, which in the end limits the attainable distance and data rate of the optical transmission system. With power level handling device such as optical power level discriminator 100/200 being employed at various optical nodes, together with the use of directly modulated transmitter 300, optical network 600 is able to achieve better system performance, represented by improved system bit error rate (BER) as a result of reshaped waveform and improved signal extinction ratio.

Thus, as shown in FIG. 7, for example, in optical network 600, optical signals may travel along a path direction such that optical signals are transmitted or launched out of optical node 650a, along fiber span 170a for receipt at optical node 650b which further transmits optical signals along fiber span 170b for receipt at optical node 650n which send signals along the fiber span 170n back to optical node 650a. Thus, in the manner depicted, an optical signal discriminator, such as discriminator 100 described herein with respect to FIG. 3 or discriminator 200 described herein with respect to FIG. 4 may be incorporated at a certain location in series with, for example, fiber span 170a (as shown in FIG. 7), in order to enhance signal extinction ratio received at the receiver of node 650b. Alternately, optical nodes including optical power discriminator(s) may be disposed in series with fiber span 170b and/or 170n for the same purpose. The location and placement of the discriminator may be optimized to achieve improved system performance.

Although a few examples of the present invention have been shown and described, it would be appreciated by those skilled in the art that changes might be made in these embodiments without departing from the principles and spirit of the invention, the scope of which is defined in the claims and their equivalents.

What is claimed is:

1. A method comprising:
 biasing a laser diode at a bias current above a lasing threshold of said laser diode;
 applying a modulation signal to said laser diode to produce a first output optical signal having first and second signal power levels corresponding to first and second signal states,
 splitting said first output optical signal into first and second branch signals;
 providing a first phase shift to said first signal state of said first branch signal;
 providing a second phase shift to said second signal state of said first branch signal; and,
 combining said first branch and second branch signals to produce a second output optical signal, said combining causing a constructive interference between said first signal states of said first and second branch signals, and a destructive interference between said second signal states of said first and second branch signals, resulting in a new set of first and second signal power levels, wherein said second output optical signal exhibits an improved extinction ratio represented by said new set of first and second signal power levels over that of said first output optical signal.

2. The method of claim 1, wherein said second signal power level of said first output optical signal ranges from 10% to 60% of said first signal power level of said first output optical signal.

3. The method of claim 2, wherein said second signal power level of said first output optical signal is between 40% and 50% of said first signal power level of said first output optical signal.

4. The method of claim 1, wherein said second signal power level of said second output optical signal is reduced to less than 10% of said first signal power level of said second output optical signal.

5. The method of claim 1, wherein providing said first and second phase shifts comprises causing non-linear self-phase modulation to said first and second signal states of said first branch signal.

6. The method of claim 1, wherein providing said first and second phase shifts comprises causing said first branch signal to pass through an optical fiber made of a chalcogenide glass material having a non-linear refractive index larger than 2.

7. The method of claim 1, further comprising:
 adjusting optical signal powers of said first and second branch signals to have a substantially same amount at said first signal state and at said second signal state respectively, and combining the adjusted first and second branch signals to produce said second output optical signal.

8. The method of claim 1, further comprising:
 adjusting a phase difference between said first signal states of said first and second branch signals to be substantially close to zero to result in said constructive interference.

9. The method of claim 1, further comprising:
 adjusting a phase difference between said second signal states of said first and second branch signals to be substantially close to 180-degree to result in said destructive interference.

10. An optical signal transmitter comprising:
 a laser diode operating at a bias current above a lasing threshold of said laser diode;
 a modulating device for applying a modulation signal to said laser diode to produce a first output optical signal having first and second signal power levels corresponding to first and second signal states; and,
 a power level discriminator for improving an extinction ratio of said first output optical signal received from said laser diode, said power level discriminator comprising:
  a splitter for receiving said first output optical signal, and splitting said received first output optical signal into a first branch signal and a second branch signal;
  a first optical signal path, attached to a first output port of said splitter, for transporting said first branch signal, said first optical signal path providing a first phase shift to said first signal state of said first branch signal and a second phase shift to said second signal state of said first branch signal, wherein said first phase shift is different from said second phase shift;
  a second optical signal path, attached to a second output port of said splitter, for transporting said second branch signal; and
  a combiner having a first and a second input port being attached to said first optical signal path and said second optical signal path respectively, said combiner combining said first branch signal and said second branch signal to produce a second output optical signal, said second output optical signal being resulted from a constructive interference between said first signal states of said first and second branch signals, and a destructive interference between said second signal states of said first and second branch signals and having a new set of first and second signal power levels.

11. The transmitter of claim 10, wherein prior to being received by said power level discriminator said second signal power level of said first output optical signal ranges from 10% to 60% of said first signal power level of said first output optical signal.

12. The transmitter of claim 11, wherein prior to being received by said power level discriminator said laser diode produces said second signal power level of said first output optical signal that is between about 40% and 50% of said first signal power level of said first output optical signal.

13. The transmitter of claim 10, wherein said second signal power level of said second output optical signal is reduced by said destructive interference to less than 10% of said first signal power level of said second output optical signal.

14. The transmitter of claim 10, wherein said first and second optical signal paths are first and second optical fibers, said first optical fiber having a large non-linear refractive index, said non-linear refractive index providing different amount of self-phase modulation to said first and second signal states of said first branch signal, causing said first and second phase shifts.

15. The transmitter of claim 10, wherein said first optical fiber is made of a chalcogenide glass material, having a non-linear refractive index larger than 2.

16. The transmitter of claim 15, wherein said chalcogenide glass material includes chalcogen element of sulfur, selenium and tellurium, and at least one of the following elements: germanium, silicon, phosphorous, arsenic and antimony.

17. The transmitter of claim 10, wherein said splitter provides a power splitting ratio of x:y toward said first and second optical signal paths respectively, where x represents a power level of said first branch signal and y represents a power level of said second branch signal, and wherein said combiner provides a power combining ratio of y:x coming from said first and second optical signal paths respectively.

18. The transmitter of claim 10, further comprising:
an amplifier connecting said first output port of said splitter to said first optical fiber for boosting power of said first and second signal states of said first branch signal, thereby enhancing said self-phase modulation to said first and second signal states of said first branch signal.

19. The transmitter of claim 10, further comprising:
an attenuator in series with said first optical fiber for adjusting power of said first branch signal in such a way that a correct amount of power may be used for causing said constructive interference between said first signal states of said first and second branch signals, and said destructive interference between said second signal states of said first and second branch signals.

20. The transmitter of claim 10, further comprising:
a linear phase shifter for adjusting a phase shift of said first and second signal states of said second branch signal in said second optical fiber, thereby causing said constructive interference between said first signal states of said first and second branch signals, and said destructive interference between said second signal states of said first and second branch signals.

21. An optical network having one or more optical network nodes interconnected by at least one optical signal fiber, said network comprising:
at least a first optical network node including a transmitting device for transmitting an optical signal along an optical fiber for receipt at a second optical network node by a receiving device, wherein said transmitting device comprises:
a laser diode operating at a bias current above a lasing threshold of said laser diode;
a modulating device for applying a modulation signal to said laser diode to produce a first output optical signal having first and second signal power levels corresponding to first and second signal states respectively; and,
a power level discriminator device receiving and reshaping said first output optical signal, said power level discriminator device comprising:
a splitter for receiving said first output optical signal, and splitting said received first output optical signal into a first branch signal and a second branch signal;
a first optical signal path, attached to a first output port of said splitter, for transporting said first branch signal, said first optical signal path providing a first phase shift to said first signal state of said first branch signal and a second phase shift to said second signal state of said first branch signal, wherein said first phase shift is different from said second phase shift;
a second optical signal path, attached to a second output port of said splitter, for transporting said second branch signal; and
a combiner having a first and a second input port being attached to said first optical signal path and said second optical signal path respectively, said combiner combining said first branch signal and said second branch signal to produce a second output optical signal, said second output optical signal being resulted from a constructive interference between said first signal states of said first and second branch signals, and a destructive interference between said second signal states of said first and second branch signals and having a new set of first and second signal power levels,
wherein said second output optical signal, having a new set of first and second signal power levels, is received at said second optical network node by said receiving device.

22. The optical network of claim 21, wherein prior to receipt at said power level discriminator device said second power level of said first output optical signal ranges between 10% and 60% of said first power level of said first output optical signal.

23. The optical network of claim 22, wherein, prior to being received and reshaped by said power level discriminator device, said second signal power level of said first output optical signal is between about 40% and 50% of said first signal power level of said first output optical signal.

24. The optical network of claim 21, wherein, after being received and reshaped by said power level discriminator device, said second signal power level of said second output optical signal is reduced to less than 10% of said first signal power level of said second output optical signal.

25. The optical network of claim 21, wherein said splitter provides a power splitting ratio of x:y where x represents a power level of said first branch signal and y represents a power level of said second branch signal, and wherein said combiner has a power combining ratio of y:x.

* * * * *